Jan. 21, 1930.  H. P. RHETT  1,744,576

GEAR WHEEL

Filed Feb. 25, 1929

Inventor

Henry P. Rhett

By Church & Church

His Attorneys

Patented Jan. 21, 1930

1,744,576

UNITED STATES PATENT OFFICE

HENRY P. RHETT, OF BEDFORD, VIRGINIA

GEAR WHEEL

Application filed February 25, 1929. Serial No. 342,488.

This invention relates to improvements in gear wheels.

When one gear wheel is moved into mesh with another it quite often occurs that when the two gears first engage each other the teeth thereof do not fully register so that there is a crashing or jarring of the gears. This is particularly true of the operation of the present type of selective transmission commonly found in automobiles. In the present day automobile, it is essential that the operator rely on his ability to "feel out" the speed of the rotating gears and to make his shift when he judges the speed of the gears to be approximately synchronized. When his judgment is faulty there is the resulting clashing or grinding of the gear teeth.

In view of this the particular object of the present invention is to provide a gear in which there is practically entirely eliminated the clashing or grinding of the teeth when the same is attempted to be meshed with another gear.

With these and other objects in view the present invention consists of certain novel details of construction and combinations and arrangements of parts, all as will be hereinafter more fully described and the novel features thereof particularly pointed out in the appended claims.

In the accompanying drawings.

Figure 1:
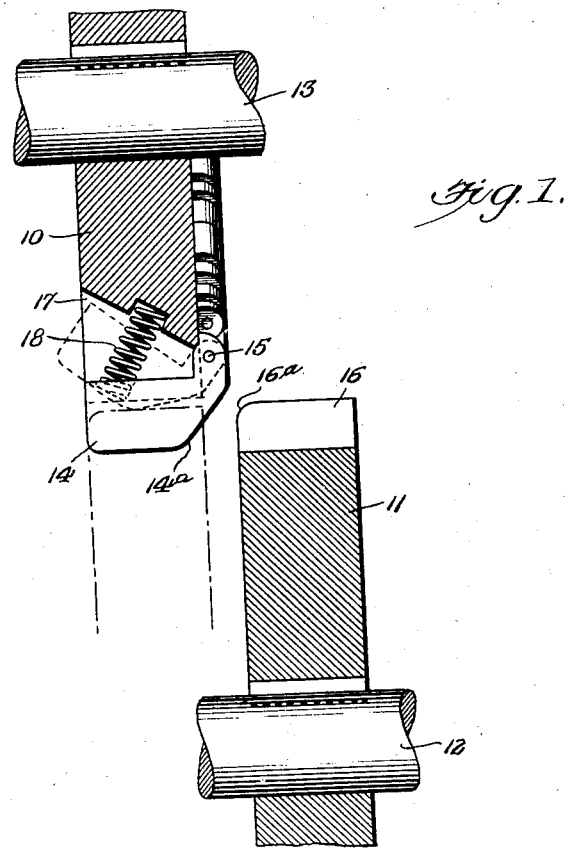
Figure 1 illustrates two cooperating gears, one of which has embodied therein the present invention.
Figure 2:
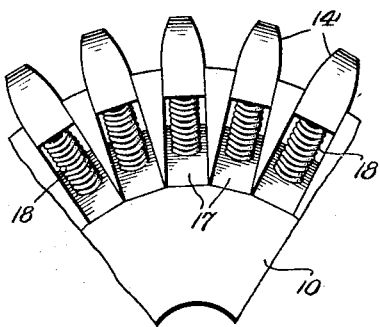
Fig. 2 is a view of one side of a gear embodying the present invention.
Figure 3:
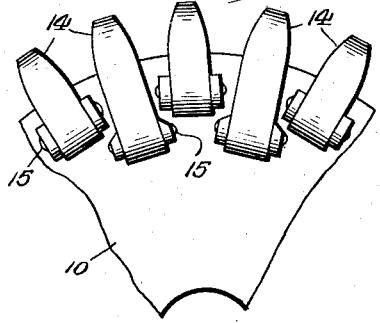
Fig. 3 is a similar view of the opposite side of the gear.

In the present instance there is more or less conventionally shown a pair of gears 10, 11, such as are present in the selective transmission arrangements of automobiles, gear 11 being mounted on shaft 12, and gear 10 being keyed to and longitudinally movable of shaft 13 whereby it may be moved into and out of mesh with gear 11. Instead of both of the gears having integral rigid teeth, one of said gears has the teeth movably secured thereto in such wise that said movable teeth may be moved relative to the body of the gear on which they are carried whereby their crowns will only lightly engage against the crowns of the other gear in the event that the teeth of the two gears do not properly mesh when brought into engagement. In other words, one gear is provided with movable teeth which are capable of riding over the crowns of the teeth of the other gear should said gears be moved into engagement while revolving at different speeds and at a time when the two sets of teeth are not positioned relatively to each other so as to properly mesh.

As shown in the accompanying drawing, the teeth 14 of gear 10 are movable on said gear, being preferably pivotally secured as at 15, the pivoted centers of said teeth being arranged at right angles to the plane of rotation of gear 11. Gear 10 is formed with a plurality of radial slots 17 in its periphery, one for each tooth 14, the depth of the slots being such that the teeth can turn on their pivotal centers so as to position their crowns substantially flush with the periphery of the gear. In the event shaft 12 is positioned below shaft 17 it is possible that the pivoted teeth 14 of gear 10 will fall by gravity beyond the body portion of said gear, so to speak, particularly around the lower portion of the periphery so that they will be in position to cooperate with the fixed teeth 16 of gear 11. However, it is preferred that teeth 14 be yieldingly, but positively, projected beyond the periphery of the body portion of gear 10. This is accomplished by having springs interposed between each tooth 14 and a wall of its slot 17 in gear 10. The crown portions of teeth 14 are more or less rounded and those edges of teeth 14 and 16 which first engage each other when the two gears are moved into mesh are also beveled or inclined as at 14$^a$, 16$^a$. With such a construction, if gear 10 is moved laterally and the teeth 14 do not properly mesh with the spaces between teeth 16 of gear 11 but engage against the ends 16$^a$ of said teeth 16, the teeth 14 will be depressed into slots 17 in gear 10 against the pressure of springs 18. So long as the gears continue to revolve at different rates of speed the crowns of teeth 16 would simply ride over the crowns of teeth 14, but when the two gears finally rotate at the proper speeds to permit meshing thereof, the springs 18 will urge teeth 14ª readily outward and into the spaces between teeth 16 of gear 11.

With gears of the type shown herein, the teeth 14 are preferably pivoted on the centers at right angles to the direction in which gear 10 is moved to engage it with gear 11 or, expressed differently, said teeth 14 are pivoted on centers at right angles to the center of rotation of the gear 10. However, in gears of other types, this particular arrangement need not necessarily be adhered to. Furthermore, the particular arrangement of slots and pivot teeth need not necessarily be followed. With the yielding or movable teeth provided on all of the gears, it will be found that the clashing or grinding of gear teeth, when an attempt is made to mesh the gears, is entirely eliminated. It might also be added that the use of non-integral teeth is advantageous in that broken teeth do not require the entire gear to be discarded as the individual teeth can be readily replaced.

What I claim is:

1. A gear wheel having the teeth thereof pivotally mounted thereon on axes at right angles to the axis of said gear, and a spring interposed between each tooth and the wheel proper for yieldingly positioning the crowns of the teeth beyond the surface of the wheel proper.

2. A gear wheel having a series of slots arranged around its periphery, a gear tooth pivotally secured in each slot with its axis at right angles to the axis of rotation of said gear, and an elastic member interposed between each tooth and a wall of its recess for yieldingly positioning the crown thereof beyond the periphery of the wheel.

HENRY P. RHETT.